United States Patent
Odate et al.

(10) Patent No.: US 10,974,736 B2
(45) Date of Patent: Apr. 13, 2021

(54) CONTROL ASSIST VEHICLE

(71) Applicant: HONDA MOTOR CO., LTD., Tokyo (JP)

(72) Inventors: Shotaro Odate, Wako (JP); Naohiro Sakamoto, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 16/088,832

(22) PCT Filed: Mar. 29, 2016

(86) PCT No.: PCT/JP2016/060014
§ 371 (c)(1),
(2) Date: Sep. 27, 2018

(87) PCT Pub. No.: WO2017/168540
PCT Pub. Date: Oct. 5, 2017

(65) Prior Publication Data
US 2020/0298881 A1   Sep. 24, 2020

(51) Int. Cl.
*B60W 60/00* (2020.01)
*B60W 50/14* (2020.01)
*G01D 5/24* (2006.01)

(52) U.S. Cl.
CPC ........ *B60W 60/0015* (2020.02); *B60W 50/14* (2013.01); *B60W 60/0053* (2020.02);
(Continued)

(58) Field of Classification Search
None
See application file for complete search history.

(56) References Cited

U.S. PATENT DOCUMENTS

| 3,049,090 | A | * | 8/1962 | Bergen | B60K 28/06 116/67 R |
| 10,086,753 | B2 | * | 10/2018 | Ebina | B60Q 3/80 |

(Continued)

FOREIGN PATENT DOCUMENTS

| JP | 10194150 A | * | 1/2000 |
| JP | 2007-168720 | | 7/2007 |
| JP | 2011070550 A | * | 10/2011 |

OTHER PUBLICATIONS

International Search Report and Written Opinion for International Application No. PCT/JP2016/060014 dated Jun. 14, 2016, 7 pages.

*Primary Examiner* — Shelley Chen
(74) *Attorney, Agent, or Firm* — Amin, Turocy & Watson, LLP

(57) ABSTRACT

A drive assist controller verifies the driving intention of a driver on the basis of whether or not the driver is contacting the steering wheel when a lane-maintaining control is being executed. An automatic driving controller verifies the driving intention of the driver on the basis of whether or not the driver is gripping the steering wheel when automatic driving is being performed. This configuration makes it possible to appropriately determine the driving intention of a driver, by changing the method of verifying the driving intention of the driver between cases when the driver has driving authority and cases when the vehicle has driving authority.

3 Claims, 8 Drawing Sheets

(52) U.S. Cl.
CPC ............ *G01D 5/24* (2013.01); *B60W 2510/20* (2013.01); *B60W 2540/00* (2013.01)

(56) References Cited

U.S. PATENT DOCUMENTS

| | | |
|---|---|---|
| 2012/0326735 A1 | 12/2012 | Bennett et al. |
| 2013/0124046 A1* | 5/2013 | Lazic ................... B60W 30/12 701/42 |
| 2016/0368522 A1* | 12/2016 | Lubischer .............. B62D 1/183 |
| 2017/0028995 A1* | 2/2017 | Mori ..................... B60Q 9/008 |
| 2017/0106786 A1* | 4/2017 | Ebina ....................... B60Q 3/70 |
| 2017/0210408 A1* | 7/2017 | Okazaki ................. B62D 1/046 |
| 2017/0282972 A1* | 10/2017 | Moretti ................. B60W 50/04 |

* cited by examiner

CONTROL ASSIST VEHICLE

TECHNICAL FIELD

The present invention relates to a control assisted vehicle (control assist vehicle) that prompts a driver to grasp or contact a steering wheel when executing a control assist (including a semi-automated control and an automated control).

BACKGROUND ART

In Japanese Laid-Open Patent Publication No. 2007-168720, a control assisted vehicle is disclosed in which driving assistance is terminated, in the case that a decrease in a driving intention of the driver is recognized during a steering control driving assist. When confirming whether or not the driving intention of the driver is decreasing, the control assisted vehicle makes a determination by comparing an indicator (steering torque), which is indicative of the driving intention, with a threshold value.

SUMMARY OF INVENTION

In recent years, a control assisted vehicle (automated driving vehicle) having a higher degree of automated control than a conventional driving assist has been developed. In a conventional control assisted vehicle, the authority for driving is on the side of the driver. On the other hand, in recent years, with control assisted vehicles (automatically driven vehicles), there is a case in which the authority for driving is on the side of the vehicle, and a case in which the authority for driving is on the side of the driver, and in each of such cases, situations arise in which the driving intention of the driver is confirmed. In the case that the authority for driving is on the side of the vehicle, since the driver does not engage in operation of the vehicle, the behavior of the driver differs in comparison with a case in which the authority for driving is on the side of the driver. For this reason, it is not appropriate to determine the driving intention of the driver by a uniform method, for the case in which the authority for driving is on the side of the vehicle, and the case in which the authority for driving is on the side of the driver. For example, in the case that the driving intention of the driver is determined with a constant threshold value, as in the control assisted vehicle of Japanese Laid-Open Patent Publication No. 2007-168720, there is a possibility that the determination result may be incorrect.

The present invention has been devised taking into consideration the aforementioned problems, and has the object of providing a control assisted vehicle, which is capable of more appropriately determining the driving intention of a driver.

A control assisted vehicle according to the present invention includes a first controller configured to execute a first automated control including a first steering control assist in which an authority for driving is on a side of a driver, a second controller configured to execute a second automated control including a second steering control assist in which the authority for driving is on a side of the vehicle, a detector configured to distinguish between and detect a contact state in which the driver contacts a steering wheel, and a grasped state in which the steering wheel is grasped by the driver, a determination unit configured to determine whether or not to transfer the authority for driving from the vehicle to the driver, and a warning unit. The first controller is configured to issue a warning by the warning unit, in a case that, during execution of the first steering control assist, the contact state is not detected by the detector, and the second controller is configured to issue a warning by the warning unit, in a case that, during execution of the second steering control assist, it is determined by the determination unit that the authority for driving is to be transferred from the vehicle to the driver, and the grasped state is not detected by the detector.

With the present invention, in the case that the first automated control is being executed by the first controller, the driving intention of the driver is confirmed depending on whether or not the contact state exists in which the driver is in contact with the steering wheel. Further, in the case that the second automated control is being executed by the second controller, the driving intention of the driver is confirmed depending on whether or not the grasped state exists in which the steering wheel is grasped by the driver. According to the present invention, since the method of confirming the driving intention of the driver is changed between the case in which the authority for driving is on the side of the driver, and the case in which the authority for driving is on the side of the vehicle, it is possible to appropriately determine the driving intention of the driver.

In the present invention, the detector may be configured to distinguish between the contact state and the grasped state by a difference in electrostatic capacitance.

The contact area between the driver and the steering wheel becomes smaller in the contact state than in the grasped state. Stated otherwise, the electrostatic capacitance of a capacitor formed by the driver contacting or grasping the steering wheel becomes smaller in the contact state than in the grasped state. Therefore, by obtaining the electrostatic capacitance, it is possible to accurately distinguish between the contact state and the grasped state.

In the present invention, the first controller may be configured to terminate the first automated control within a predetermined time period after having issued the warning by the warning unit, and the second controller may be configured to issue the warning by the warning unit together with executing a deceleration control of the vehicle.

In accordance with the above-described configuration, by the first controller terminating the first automated control within the predetermined time period after having issued the warning by the warning unit, the driver can prepare for suspension of the first automated control. In addition, when the second controller transfers the authority for driving from the vehicle to the driver, the warning is issued by the warning unit, together with the deceleration control of the vehicle being executed, and accordingly, high safety can be assured.

According to the present invention, since the method of confirming the driving intention of the driver is changed between the case in which the authority for driving is on the side of the driver, and the case in which the authority for driving is on the side of the vehicle, it is possible to appropriately determine the driving intention of the driver.

DESCRIPTION OF EMBODIMENTS

Preferred embodiments of a control assisted vehicle according to the present invention will be described in detail below with reference to the accompanying drawings.

1. DEFINITIONS

In the present specification, states in which the driver is touching the steering wheel are distinguished between a "contact state" and a "grasped state". The grasped state or simply grasping refers to a state in which the driver is gripping the steering wheel with palms of his or her hands or a palm of one hand, and the contact area at this time is of a size on the order of the palm. On the other hand, the contact state or simply contacting refers to a state in which the driver is touching the steering wheel with one or more fingers or a portion of the palm, and the contact area at this time is of a size that is smaller than the palm.

In the present specification, the states (contact state, and grasped state) in which the driver (human body) is touching the steering wheel (contact sensor) is referred to as a "hands-on" state, and a state in which the driver (human body) is not touching the steering wheel (contact sensor) is referred to as a "hands-off" state.

In the present specification, a steering control and an acceleration/deceleration control, which are executed by the vehicle, are referred to collectively as a control assist. The control assist includes a control assist (automated control) which is executed instead of the manual control performed by the driver, in addition to a control assist (semi-automated control) in which manual controls performed by the driver are partially assisted. In the semi-automated control, there are included a lane keeping control, an ACC (autonomous cruise control or adaptive cruise control), and the like. In the case of the semi-automated control, the authority for driving the vehicle is on the side of the driver. On the other hand, automated operations are included in the automated control. In the case of the automated control, the authority for driving the vehicle is on the side of the vehicle.

In the present specification, the term "temporary override" refers to prioritizing the manual control over the automated control, in a state in which the automated control is continued. Further, stopping the automated control, and transferring the authority for driving from the vehicle to the driver is referred to as a "handover".

2. CONFIGURATION OF CONTROL ASSISTED VEHICLE 10

Figure 1:
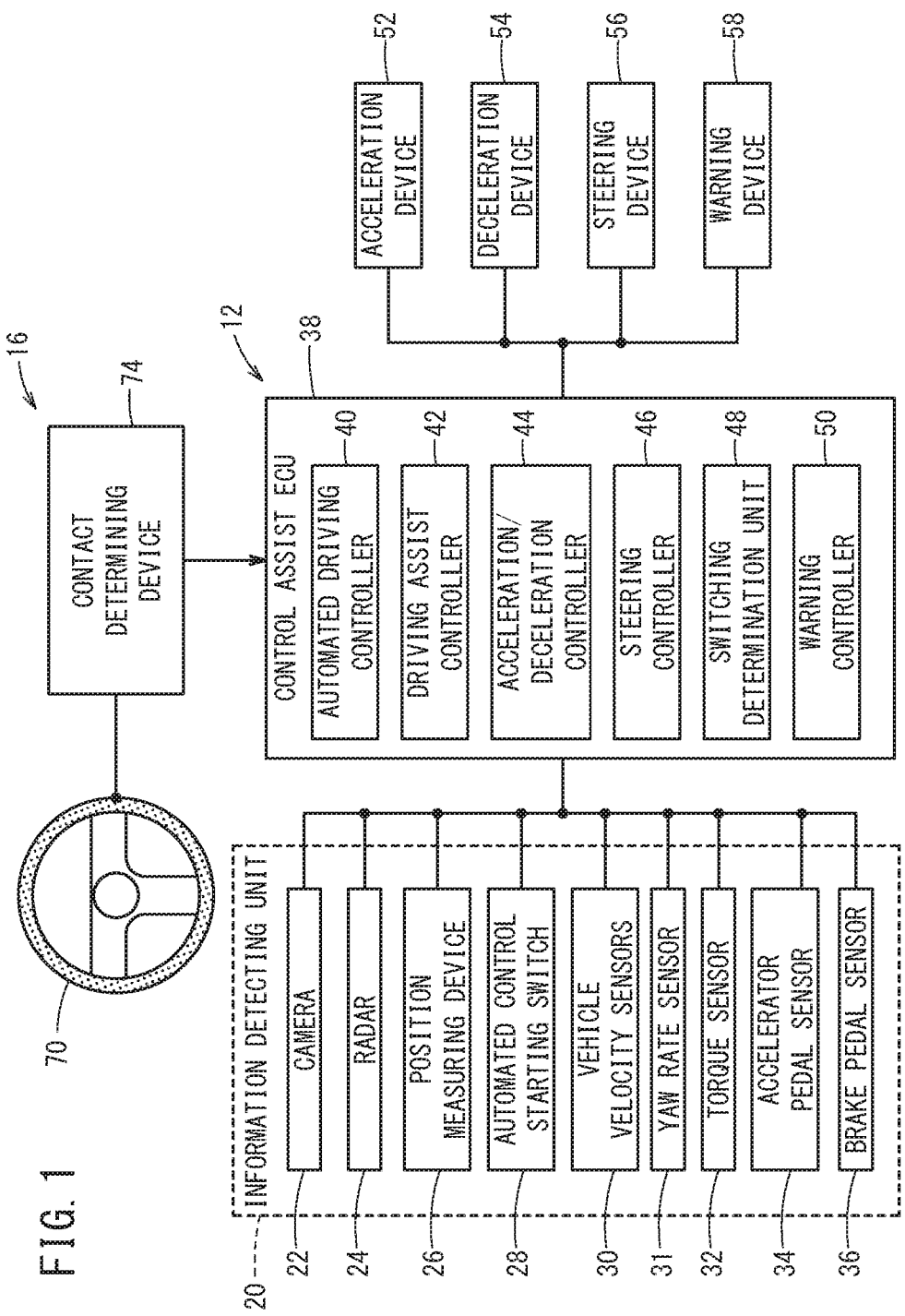
FIG. 1 is a block diagram of a control assisted vehicle according to the present embodiment.
Figure 2:
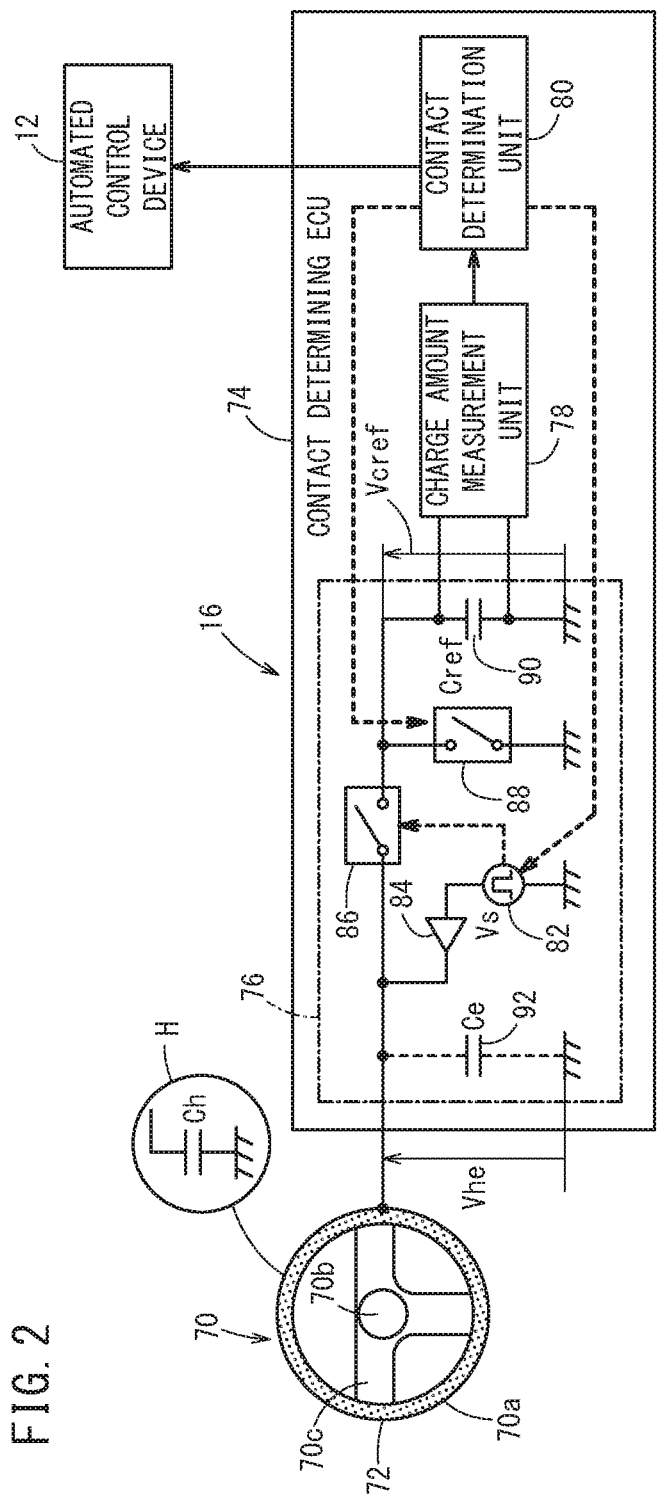
FIG. 2 is a block diagram of a contact determining device according to the present embodiment.

As shown in FIGS. 1 and 2, the control assisted vehicle 10 (also referred to simply as a vehicle 10) according to the present embodiment includes a control assist device 12 that controls and assists the vehicle 10, and a contact determining device 16 that determines whether or not a driver H is in contact with and grasping a steering wheel 70.

3. CONFIGURATION OF CONTROL ASSIST DEVICE 12

As shown in FIG. 1, the control assist device 12 is equipped with an information detecting unit 20, a control assist ECU 38, and controlled devices 52, 54, 56, 58.

The information detecting unit 20 is made up from devices (sensors, switches, etc.) for acquiring information necessary for executing the control assist. The information detecting unit 20 includes, for example, a camera 22, a radar 24, a position measuring device 26, an automated control starting switch 28, vehicle velocity sensors 30, a yaw rate sensor 31, a torque sensor 32, an accelerator pedal sensor 34, and a brake pedal sensor 36.

For example, the camera 22 is installed on an upper part on an inner side of the windshield of the vehicle 10, and captures images of the front of the vehicle 10. As the camera 22, a monocular camera or a stereo camera can be used. For example, the radar 24 is installed on a front grill of the vehicle 10, and irradiates electromagnetic waves around the periphery of the vehicle 10 and detects reflected waves. As the radar 24, a radar device such as a millimeter wave radar, a microwave radar, a laser radar, or the like can be used, or an infrared sensor can also be used. Moreover, it is also possible to use a fusion sensor which combines the imaging information from the camera 22 and the detected information from the radar 24. The position measuring device 26 measures the position of the vehicle 10, and is equipped with a satellite positioning system and a gyroscope or the like for inertial navigation, and a storage unit in which map information is stored including information of segments in which automated driving is possible.

The automated control starting switch 28 is disposed in the vicinity of the driver's seat, and is operated by the driver H who intends to initiate the control assist. The vehicle velocity sensors 30 are provided in each of the vehicle wheels (not shown) of the vehicle 10, and detect the traveling velocity of the vehicle 10.

The yaw rate sensor 31 detects a yaw rate of the vehicle 10. The torque sensor 32 detects a steering torque TR which is generated, for example, in a steering shaft (not shown). The accelerator pedal sensor 34 detects an amount at which an accelerator pedal (not shown) is depressed. As the accelerator pedal sensor 34, a stroke sensor or a pressure sensor can be used. The brake pedal sensor 36 detects an amount at which a brake pedal (not shown) is depressed. As the brake pedal sensor 36, a stroke sensor or a pressure sensor can be used.

The control assist ECU 38 is a computational device including a microcomputer, and further includes a CPU, a ROM (including an EEPROM), a RAM, and in addition thereto, input/output devices such as an A/D converter, a D/A converter and the like, and a timer that serves as a timekeeping unit. By the CPU reading out and executing programs stored in the ROM, the control assist ECU 38 functions as various function realizing units, such as a control unit, a computation unit, a processing unit, and the like. The function realizing units can also be configured in the form of hardware (function implementing devices). The control assist ECU 38 may be constituted from only one ECU, or may be constituted from a plurality of ECUs.

Moreover, a contact determining ECU 74, to be described later, is configured in the same manner as the control assist ECU 38.

By the CPU executing the aforementioned programs, the control assist ECU 38 functions as an automated driving controller 40, a driving assist controller 42, an acceleration/deceleration controller 44, a steering controller 46, a switching determination unit 48, and a warning controller 50.

The automated driving controller 40 is configured in a manner so as to perform automated driving, and more specifically, so as to perform a control assist (automated control) instead of a manual control performed by the driver H. The automated driving controller 40 is configured to acquire from the information detecting unit 20 information necessary for automated driving, and to formulate action plans for the vehicle 10. For example, the automated driving controller 40 sets a travel route to a destination. Further, the automated driving controller 40 sets a travel line, and determines vehicle velocity information, acceleration/deceleration information, and steering information in order to cause the vehicle 10 to travel along the travel line.

The driving assist controller 42 is configured so as to perform a driving assist, and more specifically, to perform a control assist (semi-automated control) for partially assisting the manual control performed by the driver H. For example, when a lane keeping control is performed, the driving assist controller 42 acquires necessary information from the information detecting unit 20, and determines a steering assist amount so that the vehicle 10 travels substantially at the center of the travel lane. Further, when the ACC is performed, the driving assist controller 42 acquires necessary information from the information detecting unit 20, and determines an acceleration/deceleration control amount in a manner so as to maintain an inter-vehicle distance between the vehicle 10 and a preceding vehicle constant.

The acceleration/deceleration controller 44 is configured to execute the acceleration/deceleration control on the basis of vehicle velocity information and acceleration/deceleration information, which are determined by the automated driving controller 40 or the driving assist controller 42. The acceleration/deceleration controller 44 outputs acceleration instructions to an acceleration device 52, and outputs deceleration instructions to a deceleration device 54. The steering controller 46 is configured so as to execute a steering control on the basis of steering information determined by the automated driving controller 40 or the driving assist controller 42. The steering controller 46 outputs steering instructions to a steering device 56.

The switching determination unit 48 is configured so as to perform, on the basis of the information acquired from the information detecting unit 20, a stop determination of the control assist in the semi-automated control, and a stop or a temporary stop determination of the control assist in the automated control. For example, in the case that the driver H operates the steering wheel 70 during a semi-automated control such as a lane keeping control, and the torque sensor 32 has detected a steering torque TR that is greater than or equal to a predetermined value, the switching determination unit 48 instructs the driving assist controller 42 to stop the lane keeping control.

Further, there may be cases during the automated control, and more specifically during automated driving, in which the driver H desires to carry out an acceleration/deceleration control by way of a manual control. In this case, the driver H operates the brake pedal (or the accelerator pedal). This is an override operation. At this time, the brake pedal sensor 36 (the accelerator pedal sensor 34) detects the override operation. In accordance with a detection signal output from the brake pedal sensor 36, the switching determination unit 48 instructs the automated driving controller 40 to temporarily stop (override) the acceleration/deceleration control. As a result, the driver H becomes capable of performing the acceleration/deceleration operation by herself/himself.

Further, there may be cases during the automated control, and more specifically during automated driving, in which the driver H desires to carry out a steering control by way of a manual control. In this case, the driver H operates the steering wheel 70. This is also an override operation. At this time, the torque sensor 32 detects the steering torque TR. In the case that the steering torque TR detected by the torque sensor 32 becomes greater than or equal to an override threshold value TRth, the switching determination unit 48 instructs the automated driving controller 40 to temporarily stop (override) the steering control. As a result, the driver H becomes capable of performing the steering operation by herself/himself.

Further, the switching determination unit 48 determines whether or not to transfer the authority for driving from the vehicle 10 to the driver H, or stated otherwise, whether or not a handover is required. For example, when an override operation related to the acceleration/deceleration control and an override operation related to steering are performed within a predetermined time period, the switching determination unit 48 instructs the automated driving controller 40 to stop the automated control (to perform the handover). Further, in the case that the vehicle 10 comes into proximity to an end position of automated driving, the switching determination unit 48 instructs the automated driving controller 40 to stop the automated control (to perform the handover).

The warning controller 50 is configured so as to output a warning instruction on the basis of the control assist content executed by the automated driving controller 40 and the driving assist controller 42, and the determination result of the contact determining device 16. Further, the warning controller 50 is configured to make a request for a handover to the driver H, in response to a request from the switching determination unit 48.

The acceleration device 52 operates a drive source of the vehicle 10 in accordance with the acceleration instruction output from the control assist ECU 38. In the case that the vehicle 10 is an engine vehicle, a throttle valve or the like is operated in accordance with the acceleration instruction, and thereby operates the drive source (engine). In the case that the vehicle 10 is an electric vehicle including an electric motor, the drive source (electric motor) is operated in accordance with the acceleration instruction. At the time of doing so, the vehicle 10 accelerates. The deceleration device 54 operates a brake actuator in accordance with a deceleration instruction output from the control assist ECU 38, and thereby operates the brake. At the time of doing so, the vehicle 10 decelerates. The steering device 56 operates an electric motor for electric power steering in accordance with a steering instruction output from the control assist ECU 38. The electric motor rotates the steering shaft. At the time of doing so, the vehicle 10 changes course. A warning device 58 operates a speaker and/or a display in response to a warning instruction output from the control assist ECU 38, and thereby issues a warning. Furthermore, such a warning may be issued by vibrating the steering shaft, a seat belt, the accelerator pedal, or the like.

4. CONFIGURATION OF CONTACT DETERMINING DEVICE 16

As shown in FIG. 2, the contact determining device 16 comprises the steering wheel 70 and the contact determining ECU 74.

The steering wheel 70 constitutes a portion of the steering device 56 that is operated by the driver H when the vehicle 10 is traveling. Generally, the steering wheel 70 includes a rim portion 70a formed in an annular shape, a hub portion 70b connected to the steering shaft, and spoke portions 70c interposed between the rim portion 70a and the hub portion 70b. As will be discussed later, a contact sensor 72 is formed in the rim portion 70a.

The rim portion 70a is a laminated structure the cross section of which is made up from a plurality of layers. As an example, the rim portion 70a is equipped with an annular core metal, a resin member, and a leather member, provided in this order toward a radial outer side from a cross-sectional center portion. The core metal constitutes a skeletal structure of the rim portion 70a. The resin member is formed in a generally circular cross-sectional shape or an elliptical cross-sectional shape, and covers the entire surface of the metal core with a sufficient thickness, and thereby defines the overall shape of the rim portion 70a. The leather member covers the entire surface of the resin member.

The contact sensor 72 (the dotted portion shown in FIG. 2), which is made up from a conductive material, is formed on the surface of the leather member, and furthermore, a protective film is coated over the entirety of the rim portion 70a. The protective film does not insulate or electrically isolate the surface of the contact sensor 72. The contact sensor 72 is formed, for example, by application of a conductive paint, and covers substantially the entire surface of the leather member. The contact sensor 72 is an electrostatic capacitance sensor which, in the case of the hands-on state, utilizes the driver H (human body H) as a capacitor of an electrostatic capacitance Ch.

Moreover, the contact sensor 72 may be provided only on a front side (in a rearward direction of the vehicle), may be provided only on a rear side (in a frontward direction of the vehicle), and may be provided only on side surfaces (in a widthwise direction of the vehicle) of the steering wheel 70. Further, the contact sensor 72 may be divided into a plurality of sensors. In such a case, each of the contact sensors 72 is connected to a later-described contact measurement circuit 76. The contact sensor 72 may be formed around the entire circumference of the steering wheel 70, or may be formed partially therearound. The contact sensor 72 may be a conductive sheet rather than a conductive coating.

In the same manner as the control assist ECU 38, the contact determining ECU 74 is a computation device including a microcomputer. The configuration of the ECU is as described previously.

The contact determining ECU 74 is equipped with the contact measurement circuit 76, a charge amount measurement unit 78, and a contact determination unit 80. FIG. 2 shows an equivalent circuit of the contact measurement circuit 76. The contact measurement circuit 76 includes a pulse power source 82, an amplifier 84, a first switch 86, a second switch 88, and a charging capacitor 90 having a static capacitance Cref. Further, in the contact measurement circuit 76, a stray capacitance Ce exists inherently in the respective components, the wiring, etc. In this instance, the respective components, the wiring, etc., are regarded as a virtual capacitor 92 of the stray capacitance Ce. The electrostatic capacitance Cref of the charging capacitor 90 is set to be sufficiently larger than the stray capacitance Ce and the electrostatic capacitance Ch of the human body H.

The pulse power source 82 and the amplifier 84 are connected in series. The second switch 88 and the charging capacitor 90 are connected in parallel. Furthermore, a series circuit made up from the pulse power source 82 and the amplifier 84 is connected to one end, and a parallel circuit made up from the second switch 88 and the charging capacitor 90 is connected to the other end of the first switch 86. In addition, an output end of the amplifier 84, the one end of the first switch 86, and the contact sensor 72 are electrically connected.

The pulse power source 82 supplies a constant pulse voltage Vs at a predetermined frequency in accordance with a power supply instruction from the contact determination unit 80. The amplifier 84 amplifies the pulse voltage Vs that is supplied from the pulse power source 82. The first switch 86 is placed in an energized state in accordance with a rise, and is placed in a non-energized state in accordance with a fall in the pulse voltage Vs of the pulse power supply 82. A MOSFET, for example, is used as the first switch 86. The second switch 88 is placed in an energized state in accordance with an ON signal, and is placed in a non-energized state in accordance with an OFF signal, which are output from the contact determination unit 80, as will be described later. By the first switch 86 being placed in the energized state, the charging capacitor 90 stores the charge that is accumulated in the human body H. Further, by the second switch being placed in the energized state, the electric charge is discharged to ground G. Detailed operations of the contact measurement circuit 76 will be described in section [5.1] below. The charge amount measurement unit 78 is configured in a manner so as to measure the charging voltage Vcref of the charging capacitor 90. The contact determination unit 80 is configured in a manner so as to periodically (for example, every several ten to several hundred milliseconds) output a power supply instruction and a power supply stop instruction to the pulse power source 82 disposed in the contact measurement circuit 76. The contact determination unit 80 is further configured in a manner so as to monitor the number of pulses N (referred to as a pulse number N) generated by the pulse power source 82, and the charging voltage Vcref of the charging capacitor 90 as measured by the charge amount measurement unit 78. In addition, the contact determination unit 80 is configured so as to compare (Nj:Nth) the number of pulses Nj required until the charging voltage Vcref reaches a predetermined charging voltage threshold value Vcth (judgment threshold value) with a pulse threshold value Nth, and to determine whether the hands-on state or the hands-off state is taking place. Furthermore, in the case of the hands-on state, the electrostatic capacitance Ch of the human body H is obtained, and by determining whether it is greater than or equal to an electrostatic capacitance threshold value Cth, the contact state in which the driver H contacts the steering wheel 70, and the grasped state in which the steering wheel 70 is grasped by the driver H are distinguished. The determination result of the contact determination unit 80 is output to the control assist device 12.

5. DESCRIPTION OF CONTACT DETERMINATION EXECUTED BY Contact Determining Device 16

[5.1 Operations of Contact Measurement Circuit 76]

The contact determining device 16 performs a contact determination on the basis of the charging result of the charging capacitor 90 which is carried out by the contact measurement circuit 76. Before describing the contact determination, operations of the contact measurement circuit 76 will be described with reference to FIGS. 3A to 3C and FIGS. 4A and 4B. In this instance, a description will be made assuming the hands-on state, that is, a state in which the driver H (human body H) is touching the contact sensor 72.

Figure 3A:
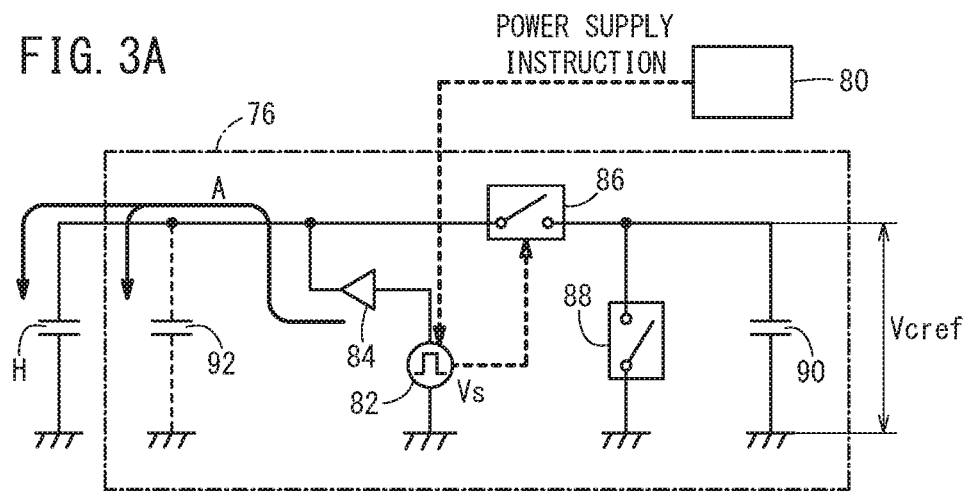
FIGS. 3A to 3C are diagrams for explaining operations of a contact measurement circuit.
Figure 3B:
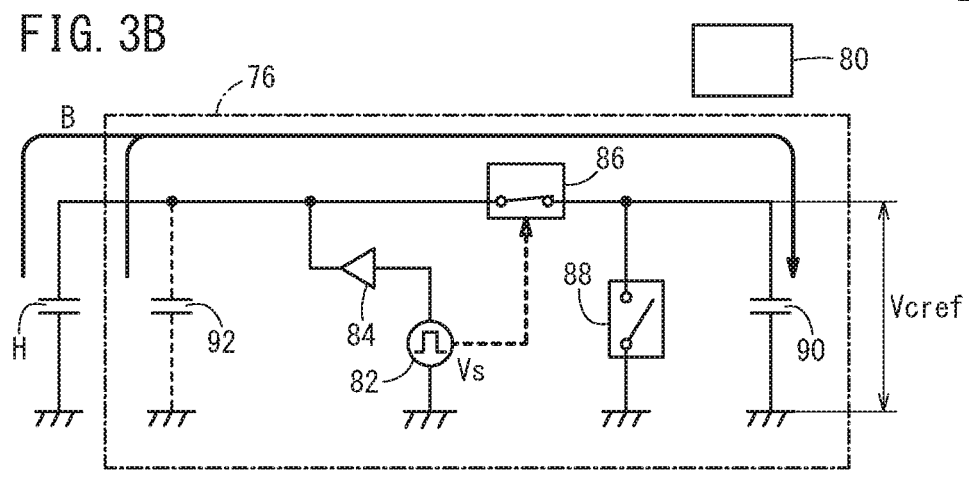

In each instance of a predetermined period, a power supply instruction is output from the contact determination unit 80 to the pulse power source 82. The supply of power by the pulse power source 82 is initiated in response to the power supply instruction. When the pulse voltage Vs of the pulse power source 82 rises, as shown in FIG. 3A, the first switch 86 is placed in a non-conductive state. At this time, the electric charge moves in the direction indicated by the arrow A. At the time of doing so, the voltage Vhe of the human body H and the virtual capacitor 92 rises, as shown at time t1 in FIG. 4A. Stated otherwise, the human body H and the virtual capacitor 92 are charged. Next, when the pulse of the pulse power source 82 falls, as shown in FIG. 3B, the first switch 86 is placed in a conductive state. At this time, the electric charge accumulated in the human body H and the virtual capacitor 92 moves in the direction indicated by the arrow B. At the time of doing so, the voltage Vhe of the human body H and the virtual capacitor 92 decreases, as shown at time t2 in FIG. 4A. Stated otherwise, the human body H and the virtual capacitor 92 are discharged. On the other hand, the voltage Vcref of the charging capacitor 90 rises, as shown at time t2 in FIG. 4B. Stated otherwise, the charging capacitor 90 is charged. As was noted previously, the electrostatic capacitance Cref of the charging capacitor 90 is sufficiently larger than the stray capacitance Ce and the electrostatic capacitance Ch of the human body H, and therefore, the majority of the charge accumulated in the human body H and the virtual capacitor 92 moves to the charging capacitor 90.

Figure 5A:
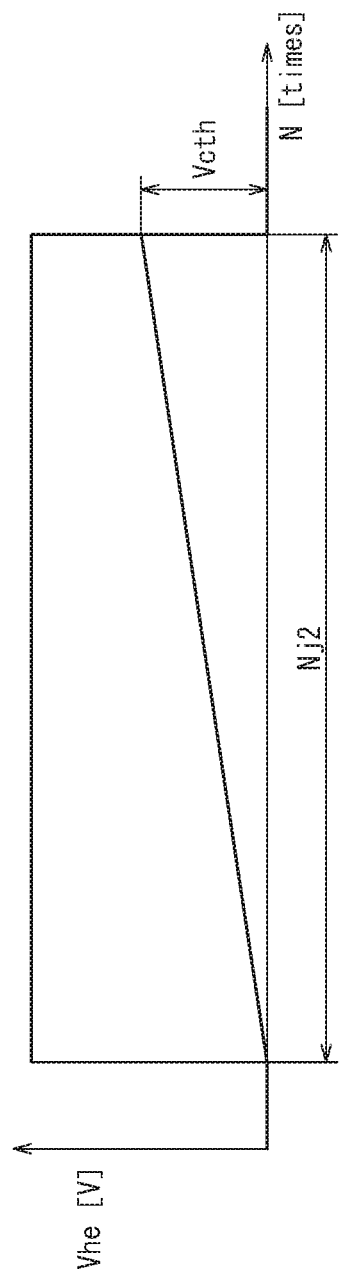
FIG. 5A is a voltage waveform diagram of a human body and/or a virtual capacitor at a time of a hands-off state.
Figure 5B:
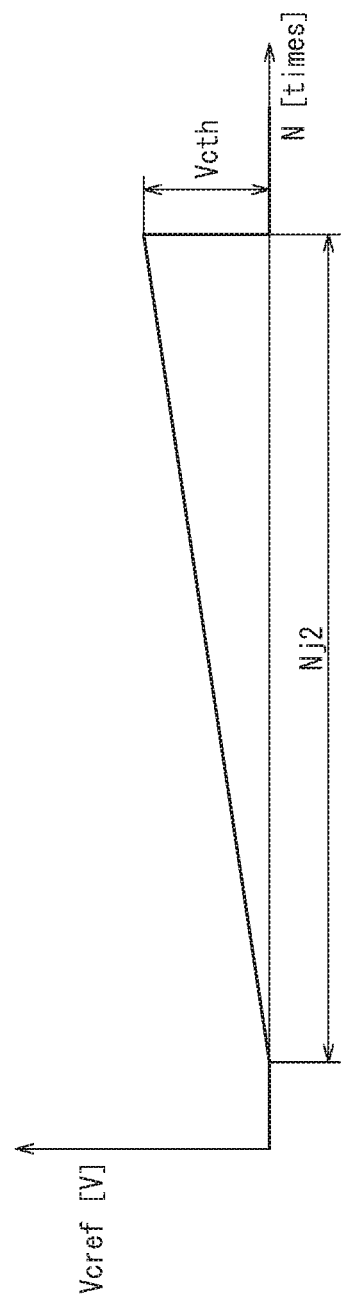
FIG. 5B is a voltage waveform diagram of a charging capacitor at the time of the hands-off state.

Thereafter, in accordance with the rise in the pulse voltage Vs, the human body H and the virtual capacitor 92 are charged (see FIG. 3A), whereas in accordance with the fall in the pulse voltage Vs, the charging capacitor 90 is charged (see FIG. 3B). As shown in FIG. 5B, as the number of pulses N increases, the charge amount of the charging capacitor 90 increases, and the charging voltage Vcref increases.

Figure 3C:
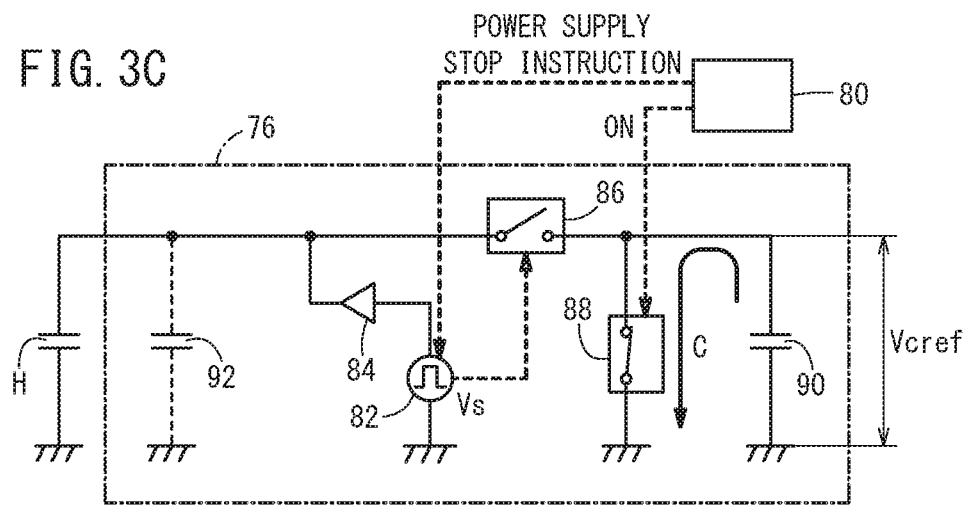
Figure 4A:
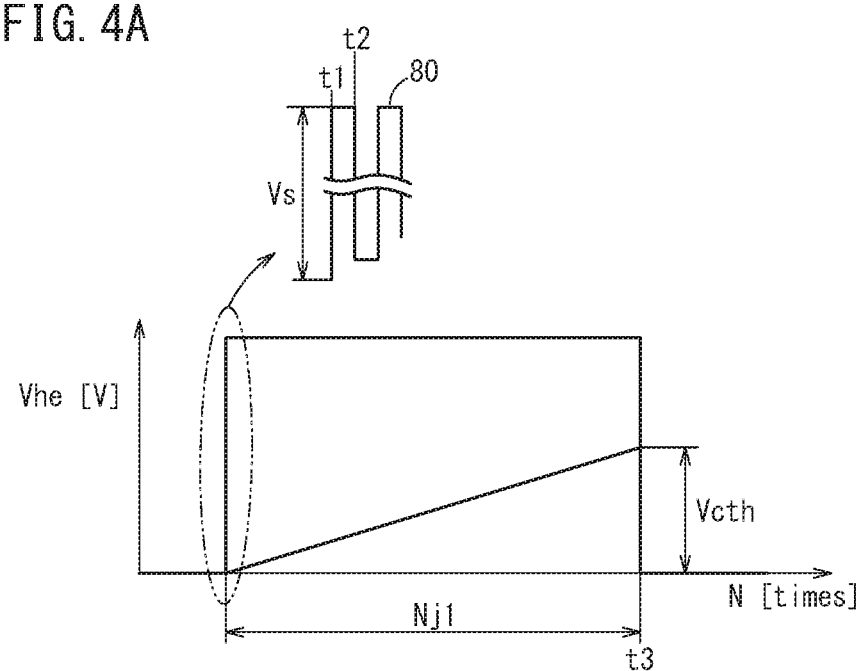
FIG. 4A is a voltage waveform diagram of a human body and/or a virtual capacitor at a time of a hands-on state.
Figure 4B:
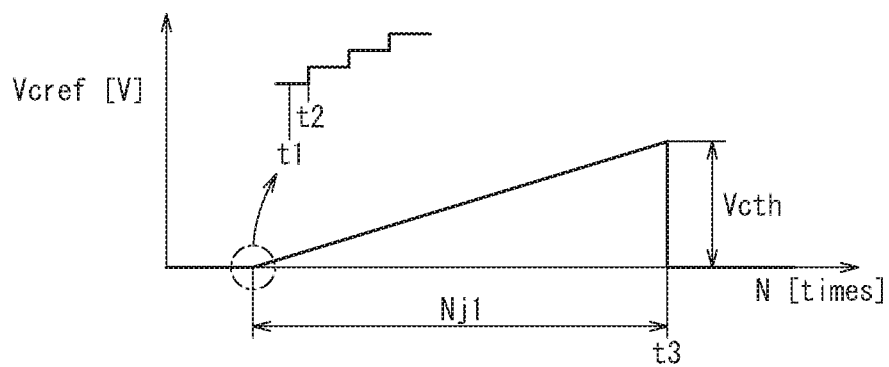
FIG. 4B is a voltage waveform diagram of a charging capacitor at the time of the hands-on state.

As shown in FIG. 4B, at a point in time when the number of pulses N is the number of pulses Nj1, the charging voltage Vcref of the charging capacitor 90 reaches the charging voltage threshold value Vcth. At this time, as shown in FIG. 3C, a power supply stop instruction is output from the contact determination unit 80 to the pulse power source 82, and supplying of power by the pulse power source 82 is stopped. Furthermore, an ON signal is output to the second switch 88 from the contact determination unit 80. At the time of doing so, the second switch 88 is placed in a conductive state. At this time, the electric charge accumulated in the charging capacitor 90 moves in the direction indicated by the arrow C. Stated otherwise, the charging capacitor 90 is discharged. After completion of the discharge, an OFF signal is output to the second switch 88 from the contact determination unit 80. At the time of doing so, the second switch 88 is placed in a non-conductive state. Thus, the state of FIG. 3A is restored. The processes described above are performed repeatedly.

In this instance, although the description was made assuming the case of the hands-on state, in the case of the hands-off state, the basic operations are the same as those described above, with the exception that there is no electric charge accumulated in the human body H. However, as will be described in section [5.4] below, the number of pulses Nj2 at the time of the hands-off state (refer to FIGS. 5A and 5B) becomes longer than the number of pulses Nj1 at the time of the hands-on state.

[5.2 Electrostatic Capacitance Ch of Human Body H]

The electrostatic capacitance Ch of the human body H is developed in the following manner. Moreover, in order to facilitate explanation thereof, in the following description, the stray capacitance Ce of the virtual capacitor 92 is not taken into consideration.

The charge ΔQ accumulated in the human body H by one pulse of the pulse power source 82 is expressed by the following equation (1).

$$\Delta Q = Vs \times Ch \tag{1}$$

Since the electrostatic capacitance Cref of the charging capacitor 90 is sufficiently large in comparison with the electrostatic capacitance Ch of the human body H, when the first switch 86 is placed in a conductive state as shown in FIG. 3B, the majority of the charge ΔQ moves to the charging capacitor 90. Therefore, the following equation (2) is satisfied, and when the form of equation (2) is modified, the following equation (2)' is satisfied.

$$\Delta Q = Cref \times \Delta Vcref \tag{2}$$

$$\Delta Vcref = \Delta Q / Cref \tag{2'}$$

Assuming that accumulation and movement of charges are repeated N times, and the charging voltage threshold value Vcth is reached, the following equation (3) is satisfied.

$$Vcth = \Delta Vcref \times N \tag{3}$$

Substituting the aforementioned equation (1) and the aforementioned equation (2)' into the above equation (3), the following equation (4) is satisfied.

$$Vcth = \Delta Q / Cref \times N = Vs \times Ch / Cref \times N \tag{4}$$

From the above equation (4), the following equation (5) is obtained.

$$Ch = (Vcth/Vs) \times (Cref/N) \tag{5}$$

As described above, the electrostatic capacitance Ch of the human body H is determined by the charging voltage threshold value Vcth, the voltage Vs of the pulse power source 82, the static capacitance Cref of the charging capacitor 90, and the number of pulses N. Moreover, the electrostatic capacitance Ch varies depending on the contact area between the human body H and the contact sensor 72. Therefore, by measuring the electrostatic capacitance Ch, it is possible to estimate whether the human body H is in contact with the steering wheel 70 (contact sensor 72), or is grasping the steering wheel 70, and further, whether a two-handed grip or a one-handed grip is being made.

[5.3 Contact Determination Method 1]

Figure 6:
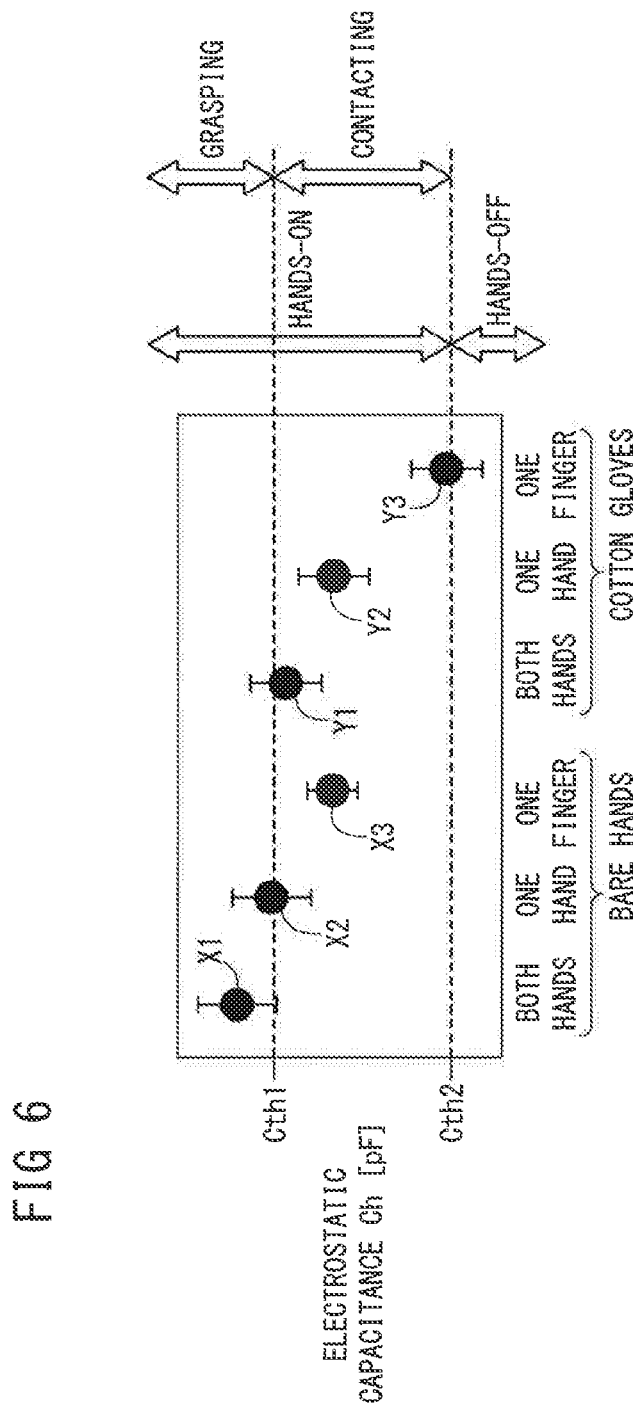
FIG. 6 is an explanatory diagram for providing a description of an electrostatic capacitance in a grasped state and an electrostatic capacitance in a contact state.
Figure 7:
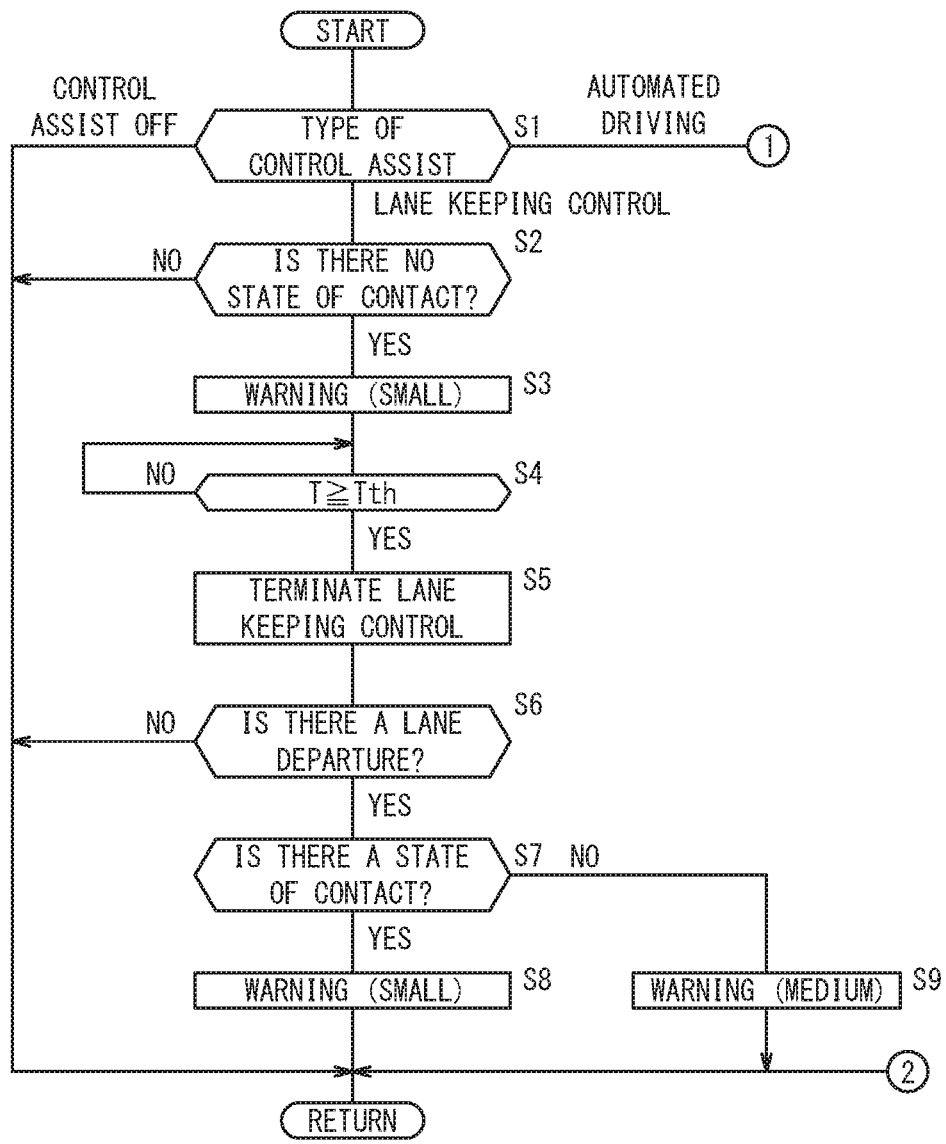
FIG. 7 is a flowchart of processes performed in the control assisted vehicle according to the present embodiment.

FIG. 6 shows the electrostatic capacitance Ch for cases in which the steering wheel 70 (X1) is grasped with bare hands and with both hands, (X2) is grasped with a bare hand and with one hand, (X3) is contacted with one finger of a bare hand, (Y1) is grasped with both hands while wearing cotton gloves, (Y2) is grasped with one hand while wearing cotton gloves, and (Y3) is contacted with one finger while wearing cotton gloves. As shown in FIG. 6, the electrostatic capacitance Ch differs in the case that the steering wheel 70 is grasped with both hands (X1, Y1), in the case that the steering wheel 70 is grasped with one hand (X2, Y2), and in the case that the steering wheel 70 is contacted with one finger (X3, Y3). The electrostatic capacitance Ch satisfies the relationships X1>X2>X3 and Y1>Y2>Y3. Therefore, an appropriate number of pulses N, and an electrostatic capacitance threshold value Cth at that time is set in advance, and by comparing the electrostatic capacitance Ch of the human body H obtained by the above equation (5) with the electrostatic capacitance threshold value Cth, it is possible to distinguish between a state of grasping and a state of contact.

According to the present embodiment, a threshold value Cth1 for distinguishing between the grasped state and the contact state is set within a range including the values X1, X2, Y1, and the grasped state is determined in the case that the electrostatic capacitance Ch of the human body H is greater than or equal to the threshold value Cth1, whereas the contact state is determined in the case that the electrostatic capacitance Ch is less than the threshold value Cth1. It is also possible to distinguish between the hands-on state and the hands-off state. For example, a threshold value Cth2 for distinguishing between the hands-on state and the hands-off state is set in the vicinity of the value Y3, and the hands-on state can be determined in the case that the electrostatic capacitance Ch of the human body H is greater than or equal to the threshold value Cth2, whereas the hands-off state can be determined in the case that the electrostatic capacitance Ch is less than the threshold value Cth2.

[5.4 Contact Determination Method 2]

According to the method described in section [5.3] above, grasping and contact states can be distinguished and determined, and hands-on and hands-off states can be distinguished and determined. The determination of the hands-on state or the hands-off state can also be obtained by the following method.

Whether the driver H (human body H) is touching the contact sensor 72, and more specifically, whether a hands-on or a hands-off state is taking place, is determined by the number of pulses Nj required until the charging voltage Vcref of the charging capacitor 90 reaches the charging voltage threshold value Vcth. For example, in the case of the hands-off state, the charge amount ΔQ1 that is charged by one pulse supplied from the pulse power source 82 is given by ΔQ1=Ce×Vs=Cref×Vcref, and the voltage Vcref rises by a level given by Vcref=(Vs/Cref)×Ce. On the other hand, in the case of the hands-on state, the charge amount ΔQ2 that is charged by one pulse supplied from the pulse power source 82 is given by ΔQ2=(Ce+Ch)×Vs=Cref×Vcref, and the voltage Vcref rises by a level given by Vcref=(Vs/Cref)×(Ce+Ch). In this manner, the hands-off state and the hands-on state differ in terms of the voltage that rises with one supply of power. For this reason, the hands-on case arrives at the charging voltage threshold value Vcth in a shorter time period (the number of pulses N is smaller) than in the hands-off case. According to the present embodiment, it is possible to determine that the hands-on state is taking place in the case that the number of pulses Nj required to reach the charging voltage threshold value Vcth is smaller than the pulse threshold value Nth, and to determine that the hands-off state is taking place in the case that the number of pulses Nj is greater than the pulse threshold value Nth.

According to the present embodiment, it is possible to determine that the hands-on state is taking place in the case that the number of pulses Nj required to reach the charging voltage threshold value Vcth is smaller than the pulse threshold value Nth, and to determine that the hands-off state is taking place in the case that the number of pulses Nj is greater than the pulse threshold value Nth.

6. PROCESSES PERFORMED BY CONTROL ASSISTED VEHICLE 10

The processes performed by the control assisted vehicle 10 will be described with reference to FIGS. 1 and 2 and FIGS. 7 and 8. As a premise for the operations shown in FIGS. 7 and 8, by the contact determining ECU 74 of the contact determining device 16 performing the operations described in the above section [5.1], and by the determination method described in the above section [5.3] or [5.4], it is periodically determined whether the hands-on state or the hands-off state (or the contact state or the grasped state) is taking place. In the case of having determined the hands-off state, a time period is measured by the timer from the point in time at which the hands-off state is started.

In step S1, in the case that the control assist is not being executed (step S1: control assist off), the processes from step S2 and thereafter are not executed. In the case that a lane keeping control is being executed (step S1: lane keeping control), the process proceeds to step S2. In the case that automated driving is being executed (step S1: automated driving), the process proceeds to step S10.

In step S2, on the basis of the determination result of the contact determining device 16, the driving assist controller 42 determines whether or not a contact state (including the grasped state) is taking place in which the driver H is in contact with the steering wheel 70. In the case that a period of the contact state (including the grasped state) is not greater than or equal to a predetermined time period, or stated otherwise, in the case that a hands-off state has taken place for greater than or equal to the predetermined time period (step S2: YES), the process proceeds to step S3. On the other hand, if the period of the contact state (including the grasped state) is greater than or equal to the predetermined time period (step S2: NO), the processes from step S3 and thereafter are not executed. At this time, the driver H is regarded as having an intention to drive.

In step S3, the driving assist controller 42 makes a request to the warning controller 50 to issue a warning. The warning controller 50 outputs a warning instruction to the warning device 58. The warning device 58 issues a warning in accordance with the warning instruction. In this instance, a screen prompting the driver to assume the hands-on state is displayed on the display. Further, the electric steering motor is driven in order to vibrate the steering wheel 70. At this time, the driving assist controller 42 starts measuring time by the timer T.

In step S4, the driving assist controller 42 compares the time period measured by the timer T with a time threshold value Tth. The time threshold value Tth is a margin time period until the driver H, having been prompted by the warning, contacts (or grasps) the steering wheel 70. In the case that the time period measured by the timer T is greater than or equal to the time threshold value Tth (step S4: YES), the process proceeds to step S5. In the case that the time period measured by the timer T is less than the time threshold value Tth (step S4: NO), the process of step S4 is repeated.

In step S5, the driving assist controller 42 terminates the lane keeping control. At the time of doing so, the vehicle 10 is switched over to manual control.

In step S6, on the basis of imaging information from the camera 22, the driving assist controller 42 determines the presence or absence of a lane departure. In the case of a lane departure (step S6: YES), the process proceeds to step S7. On the other hand, if there is not a lane departure (step S6: NO), the processes from step S7 and thereafter are not executed.

In step S7, on the basis of the determination result of the contact determining device 16, the driving assist controller 42 again determines whether or not a contact state (including the grasped state) is taking place in which the driver H is in contact with the steering wheel 70. In the case that the contact state (including the grasped state) is taking place (step S7: YES), the process proceeds to step S8. In the case that the contact state (including the grasped state) is not taking place, or stated otherwise, in the case of the hands-off state (step S7: NO), the process proceeds to step S9.

In step S8 and step S9, the driving assist controller 42 makes a request to the warning controller 50 to issue a warning. The warning controller 50 outputs a warning instruction to the warning device 58. The warning device 58 issues a warning in accordance with the warning instruction. In step S8, a screen for providing a notification of the lane departure is displayed on the display. Further, the electric steering motor is driven in order to vibrate the steering wheel 70. In step S9, a screen prompting the driver to assume the hands-on state is displayed on the display, and together therewith, a warning sound is emitted. Further, the electric steering motor is driven in order to vibrate the steering wheel 70.

Figure 8:
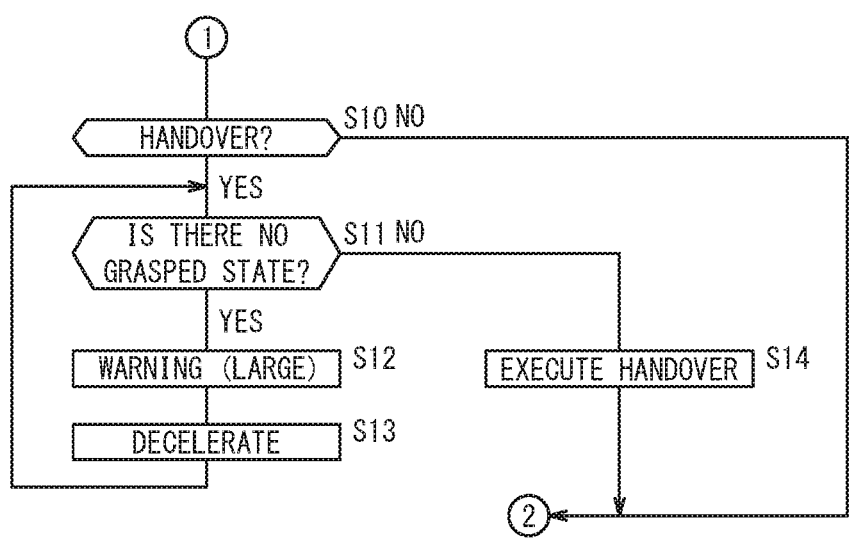
FIG. 8 is a flowchart of processes performed in the control assisted vehicle according to the present embodiment.

In step S10 shown in FIG. 8, the switching determination unit 48 determines whether or not a handover is necessary. In the case that the distance between the travel position of the vehicle 10 as measured by the position measuring device 26 and the ending position of automated driving is less than a predetermined distance, the switching determination unit 48 determines that a handover is necessary (step S10: YES). At this time, the switching determination unit 48 instructs the automated driving controller 40 to perform the handover. The process then proceeds to step S11. On the other hand, in the case that the distance between the travel position of the vehicle 10 as measured by the position measuring device 26 and the ending position of automated driving is greater than or equal to the predetermined distance, the switching determination unit 48 determines that a handover is not necessary (step S10: NO). At this time, the processes of step S11 and thereafter are not executed.

In step S11, on the basis of the determination result of the contact determining device 16, the automated driving controller 40 determines whether or not the grasped state is taking place in which the steering wheel 70 is grasped by the driver H. In the case that the grasped state is not taking place (step S11: YES), the process proceeds to step S12. On the other hand, in the case that the grasped state is taking place (step S11: NO), the process proceeds to step S14. At this time, the driver is regarded as having an intention to drive.

In step S12, the automated driving controller 40 makes a request to the warning controller 50 to issue a warning. The warning controller 50 outputs a warning instruction to the warning device 58. The warning device 58 issues a warning in accordance with the warning instruction to prompt the driver to assume a hands-on state. In this instance, a screen prompting the driver to assume the hands-on state is displayed on the display, and together therewith, a warning sound is emitted at a high volume. Further, the electric steering motor is driven in order to vibrate the steering wheel 70.

In step S13, the automated driving controller 40 makes a request to the acceleration/deceleration controller 44 to decelerate the vehicle 10. The acceleration/deceleration controller 44 outputs a deceleration instruction to the deceleration device 54. The deceleration device 54 decelerates the vehicle 10 by operating the brake actuator in accordance with the deceleration instruction. In addition, the processes from step S11 to step S13 are repeated until the steering wheel 70 is grasped by the driver H. In the case that the driver H does not grasp the steering wheel 70, after decelerating, the vehicle 10 is stopped.

In step S14, the automated driving controller 40 performs a handover, and transfers the authority for driving the vehicle 10 over to the driver H.

7. SUMMARY OF EMBODIMENT

The control assisted vehicle 10 is equipped with the driving assist controller 42 (first controller), the automated driving controller 40 (second controller), the contact determining device 16 (detector), and the warning device (warning unit) 58. The driving assist controller 42 executes the lane keeping control (first automated control) including the steering control assist (first steering control assist) in which the authority for driving is on the side of the driver H. The steering control assist that is included in the lane keeping control is a semi-automated control. The automated driving controller 40 executes automated driving (second automated control) including the steering control assist (second steering control assist) in which the authority for driving is on the side of the vehicle 10. The steering control assist that is included in automated driving is an automated control. The contact determining device 16 distinguishes and detects the contact state in which the driver H contacts the steering wheel 70, and the grasped state in which the steering wheel 70 is grasped by the driver H (step S2 and step S11). The switching determination unit 48 determines whether or not to transfer the authority for driving from the vehicle 10 to the driver H (step S10). The driving assist controller 42 issues a warning by the warning device 58, in the case that, during execution of the steering control assist, the contact state is not detected by the contact determining device 16 (step S3). The automated driving controller 40 issues a warning by the warning device 58, in the case that, during execution of the steering control assist, it is determined by the switching determination unit 48 that the authority for driving is to be transferred from the vehicle 10 to the driver H, and the grasped state is not detected by the contact determining device 16 (step S12).

According to the present invention, in the case that the lane keeping control is being executed by the driving assist controller 42, the driving intention of the driver H is confirmed depending on whether or not the contact state exists in which the driver H is in contact with the steering wheel 70. Further, in the case that automated driving is being executed by the automated driving controller 40, the driving intention of the driver H is confirmed depending on whether or not the grasped state exists in which the steering wheel 70 is grasped by the driver H. According to the present invention, since the method of confirming the driving intention of the driver H is changed between the case in which the authority for driving is on the side of the driver H, and the case in which the authority for driving is on the side of the vehicle 10, it is possible to appropriately determine the driving intention of the driver H.

The contact determining device 16 distinguishes between the contact state and the grasped state by a difference in electrostatic capacitance. The contact area between the driver H and the steering wheel 70 becomes smaller in the contact state than in the grasped state. Stated otherwise, the electrostatic capacitance of a capacitor formed by the driver H contacting or grasping the steering wheel 70 becomes smaller in the contact state than in the grasped state. Therefore, by obtaining the electrostatic capacitance, it is possible to accurately distinguish between the contact state and the grasped state.

The driving assist controller 42 terminates the lane keeping control within a predetermined time period after having issued the warning by the warning device 58 (step S5). The automated driving controller 40 issues the warning by the warning device 58 together with executing the deceleration control of the vehicle 10 (step S13).

In accordance with the above-described configuration, by the driving assist controller 42 terminating the lane keeping control within the predetermined time period after having issued the warning by the warning unit 58, the driver H can prepare for suspension of the lane keeping control. In addition, when the automated driving controller 40 transfers the authority for driving from the vehicle 10 to the driver H, the warning is issued by the warning device 58, together with the deceleration control of the vehicle 10 being executed, and accordingly, high safety can be assured.

The contact determining device 16 according to the present invention is not limited to the above-described embodiment, and it is a matter of course that various configurations could be adopted therein without departing from the essence and gist of the present invention.

8. DESCRIPTION OF REFERENCE NUMERALS

10: control assisted vehicle (vehicle)
16: contact determining device (detector)
40: automated driving controller (second controller)
42: driving assist controller (first controller)
48: switching determination unit (determination unit)
58: warning device (warning unit)
70: steering wheel

What is claim is:

1. A control assisted vehicle, comprising:
   a first controller configured to execute a first automated control including a first steering control assist in which an authority for driving is on a side of a driver;
   a second controller configured to execute a second automated control including a second steering control assist in which the authority for driving is on a side of the vehicle;
   a detector configured to distinguish between and detect a contact state in which the driver contacts a steering wheel, and a grasped state in which the steering wheel is grasped by the driver;
   a determination unit configured to determine whether or not to transfer the authority for driving from the vehicle to the driver; and
   a warning unit,
   wherein the first controller is configured to issue a warning by the warning unit in a case that, during execution of the first steering control assist, the contact state is not detected by the detector, and
   the second controller is configured to issue a warning by the warning unit in a case that, during execution of the second steering control assist, it is determined by the determination unit that the authority for driving is to be transferred from the vehicle to the driver, and the grasped state is not detected by the detector.

2. The control assisted vehicle according to claim 1, wherein the detector is configured to distinguish between the contact state and the grasped state by a difference in electrostatic capacitance.

3. The control assisted vehicle according to claim 1, wherein the first controller is configured to terminate the first automated control within a predetermined time period after having issued the warning by the warning unit, and
   the second controller is configured to issue the warning by the warning unit together with executing a deceleration control of the vehicle.

* * * * *